United States Patent [19]

Grace, Sr.

[11] Patent Number: 5,238,349

[45] Date of Patent: Aug. 24, 1993

[54] ARTICLE SORTING AND RETRIEVAL SYSTEM

[76] Inventor: Robert W. Grace, Sr., Sky Harbor Condominiums, Apartment 5K, 2100 S. Ocean Dr., Fort Lauderdale, Fla. 33316

[21] Appl. No.: 850,444

[22] Filed: Mar. 10, 1992

[51] Int. Cl.$^5$ .............................................. B65G 1/06
[52] U.S. Cl. ................................. 414/269; 187/8.59; 198/594; 198/783; 198/809; 414/278
[58] Field of Search ............... 414/268, 272, 276, 278, 414/285, 269-271, 277, 279, 331; 198/460, 594, 783, 809, 812; 187/8.59, 20

[56] References Cited

U.S. PATENT DOCUMENTS

| | | | |
|---|---|---|---|
| 2,704,149 | 3/1955 | Huey | 198/594 |
| 3,370,693 | 2/1968 | Marsden | 198/460 |
| 3,528,566 | 9/1970 | Weir | 414/285 |
| 3,534,872 | 10/1970 | Roth et al. | 198/812 X |
| 3,548,895 | 12/1970 | Gentry, Jr. | 198/594 X |
| 3,554,355 | 1/1971 | Berg | 198/594 X |
| 3,610,445 | 10/1971 | Kitchen et al. | 414/276 |
| 3,746,144 | 7/1973 | Englert | 198/592 |
| 3,805,974 | 4/1974 | Egon et al. | 414/276 |
| 4,016,986 | 4/1977 | Thomas | 414/269 X |
| 4,018,326 | 4/1977 | Hardy | 198/594 X |
| 4,130,193 | 12/1978 | Bourgeois | 198/369 |
| 4,527,937 | 7/1985 | Tamasello, Jr. | 414/276 X |
| 4,561,820 | 12/1985 | Matheny, III et al. | 198/809 X |
| 4,881,635 | 11/1989 | Raschke | 198/460 |
| 4,909,378 | 3/1990 | Webb | 198/809 X |
| 4,962,841 | 10/1990 | Kloosterhouse | 198/809 X |
| 4,983,091 | 1/1991 | Lichti, Sr. et al. | 414/331 |
| 5,000,643 | 3/1991 | Tanaka et al. | 414/267 |
| 5,024,572 | 6/1991 | Tanaka et al. | 414/276 |
| 5,165,516 | 11/1992 | Reed et al. | 198/809 X |

Primary Examiner—David A. Bucci
Attorney, Agent, or Firm—Pearne, Gordon, McCoy & Granger

[57] ABSTRACT

An article sorting and retrieval system for use in warehouses and distribution centers wherein articles are stored in vertical racks with open-sided storage bins. The system includes a linearly extensible lower conveyor assembly adapted to transport items parallel to the rows of storage bins and a vertically movable upper conveyor assembly located above and parallel to the lower conveyor assembly and adapted to convey articles in a direction opposite to that of the lower assembly and to be raised and lowered between an upper position and a lower position as desired so as to service all of the bins in each of the rows of bins. Another conveyor assembly is provided for conveying articles vertically between one end of the lower conveyor assembly and one end of the upper conveyor assembly and for reversing the direction of travel of the articles during that vertical movement. Also, a lateral transfer mechanism is provided in association with the upper conveyor assembly for selectively moving articles from the upper conveyor assembly to and from any one of the adjacent storage bins.

24 Claims, 10 Drawing Sheets

ARTICLE SORTING AND RETRIEVAL SYSTEM

BACKGROUND OF THE INVENTION

This invention relates to sorting and retrieval systems for use in warehousing facilities and the like. More particularly, the invention relates to such facilities wherein large vertical rack assemblies located side-by-side and spaced apart with aisles in between, are provided with open-sided storage bins arranged in horizontal rows and vertical columns. The invention provides an assembly of conveyors for automatically sorting cartoned merchandise in accordance with a predetermined arrangement and then, upon demand, retrieving cartoned merchandise in batches upon demand for rapid distribution.

In recent years, new distribution systems have evolved for use in retailing based on a desire to reduce storage time and provide for delivery of manufactured goods as rapidly as possible after completion of manufacture. These systems have relied upon electronic data interchange in order to reduce the turnaround time for orders placed with manufacturers by retailers. The ultimate goal is to enable retailers to supply all of their stores with overnight delivery directly from the manufacturer so as to reduce the costs of carrying large inventories of stock-keeping units.

In order to further reduce the order turnaround time, it is necessary to provide sorting and retrieval systems adapted to handle cartoned merchandise received at a warehousing facility directly from a manufacturer and to sort and retrieve the merchandise from huge storage rack installations. The ultimate goal in modern distribution philosophy is to enable the warehouse or distribution center to become a cross-dock facility where truck-load quantities of mixed stock-keeping units are received daily from individual manufacturers and reshipped to the retailer, the same day. The effect of this business strategy will eventually be to significantly reduce the necessity for large inventories at the distribution center as well as the large manpower requirements for sorting and retrieving this merchandise.

The system of the present invention satisfies the requirements discussed above and affords other features and advantages heretofore not obtainable.

SUMMARY OF THE INVENTION

It is among the objects of the present invention to receive and sort cartoned merchandise received by warehousing facilities in mixed stock-keeping units and to retrieve the cartoned merchandise of mixed variety upon demand in predetermined mixed batches to be reshipped to a retailer.

Another object of the invention is to permit effective "cross docking" of truckload quantities of mixed stock-keeping units received from manufacturers and the subsequent reshipment of batches of ordered merchandise to a retailer or other destination.

Another object of the invention is to reduce the storage time of the inventory contained in large warehousing facilities.

Still another object is to reduce the distribution costs of manufactured goods that require shipment to a distribution center and reshipment therefrom in sorted batches to an ultimate destination, such as a retailing establishment.

These and other objects and advantages are achieved with the article sorting and retrieval system of the present invention which provides a means for sorting articles received from a manufacturer and delivering them to storage bins in large assemblies of vertical storage racks. The system includes a linearly extensible lower conveyor assembly adapted to transport cartoned merchandise along aisles between rack assemblies. The lower conveyor cooperates with an inclined conveyor also located in the respective aisle and having its lower end operatively associated with an end of the lower conveyor. The other end of the inclined conveyor cooperates with a vertically movable, direction reversing conveyor which receives cartoned merchandise from the upper end of the inclined conveyor and carries it upward in a helical path while reversing its direction of travel.

The direction reversing conveyor moves with and is operatively associated with a vertically movable upper conveyor assembly located above and parallel to the lower conveyor assembly. It is adapted to be raised and lowered between an upper position and a lower position whereby it may be selectively positioned in operative association with the bins of each of the horizontal rows in the adjacent rack assembly. A means is provided for raising and lower the upper conveyor assembly along with the direction reversing conveyor.

Associated with the upper conveyor assembly is a lateral transfer means for selectively moving articles from the conveyor assembly to and from any one of the storage bins in the row adjacent the assembly.

DESCRIPTION OF THE PREFERRED EMBODIMENT

Figure 1:
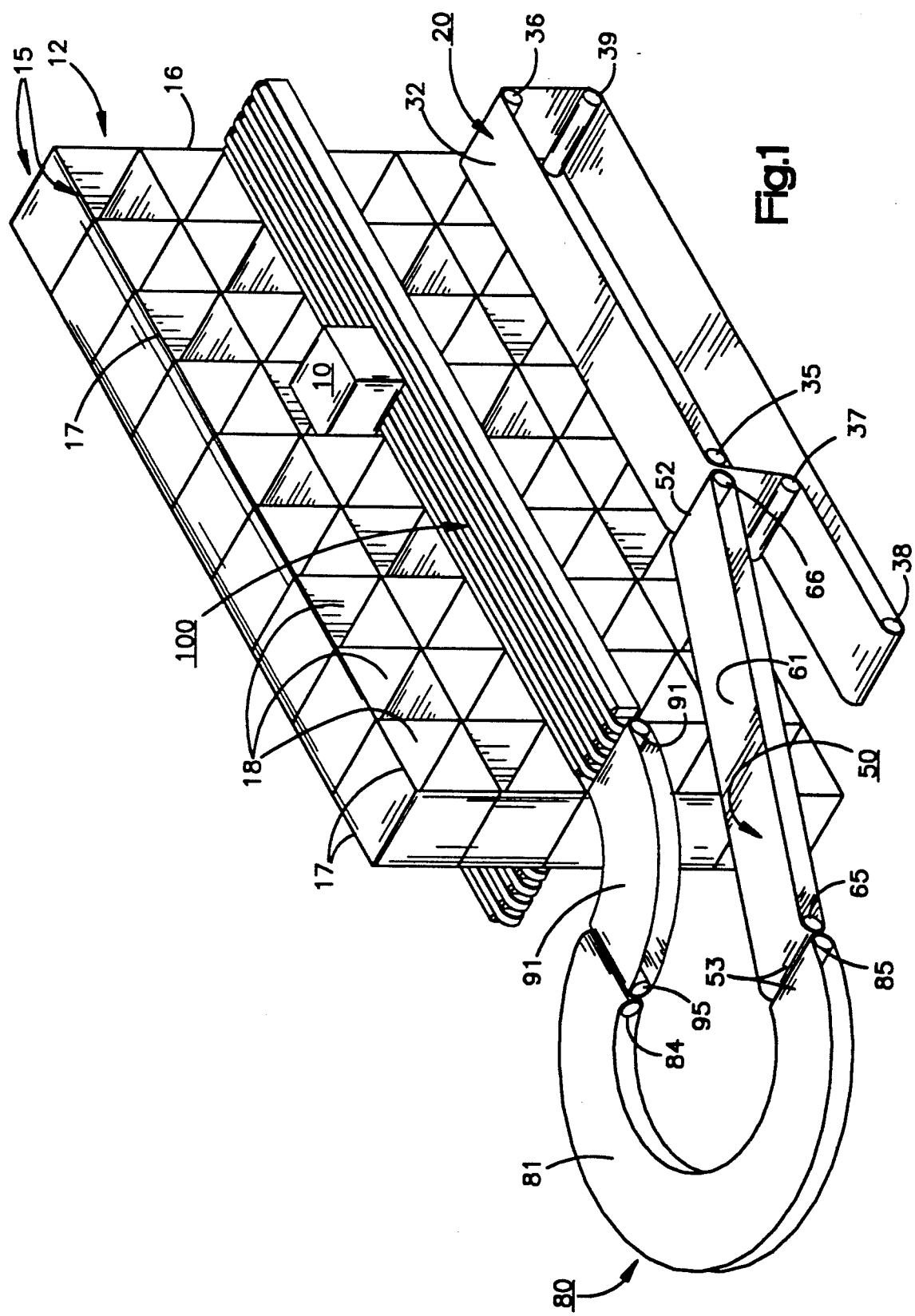
FIG. 1 is a perspective view in somewhat diagrammatic form, showing an article sorting and retrieval system for use in a warehouse or central distribution facility that includes vertical rack assemblies with open-sided storage bins.
Figure 2:
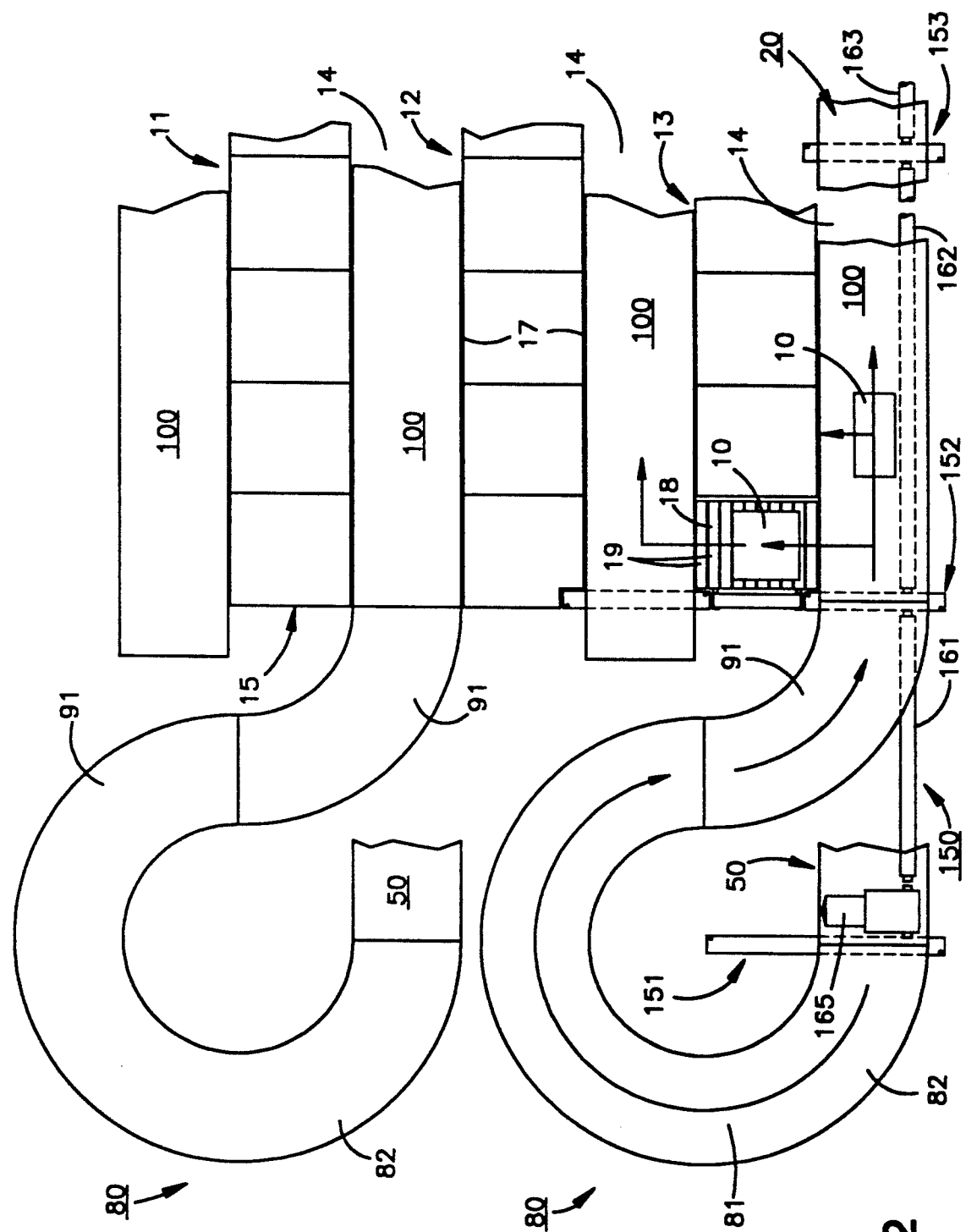
FIG. 2 is a fragmentary plan view of the sorting and retrieval system illustrated in FIG. 1.

Referring more particularly to the drawings and initially to FIGS. 1 and 2, there is shown a storage and retrieval system for use in a warehouse or central distribution facility wherein cartoned merchandise or cartons 10 are received from a manufacturer, for example, in the form of mixed stock-keeping units in less than pallet quantities. The warehousing facility has a plurality of rack assemblies 11, 12, and 13 arranged in vertical stacks with aisles 14 located therebetween. The rack assemblies have a frame 15 including interconnected vertical members 16 and horizontal members 17 that form individual storage bins 18 with floor rollers 19.

GENERAL ARRANGEMENT

The system includes as its principal components, a horizontal lower conveyor assembly 20 which is linearly extensible as will be described below, a tilting, inclined conveyor assembly 50 with its lower end pivotable about a movable axis and adapted to receive cartons 10 from the lower conveyor assembly 20. The upper end of the inclined conveyor assembly 50 is also pivoted and adapted to be raised and lowered with a direction reversing conveyor assembly 80.

The assembly 80 receives cartons from the upper end of the inclined conveyor assembly 50, carries them through a curved, helical path of travel to reverse their direction and deliver them to a vertically movable upper conveyor assembly 100. The cartons are moved linearly along the upper conveyor assembly 100 to a desired storage bin 18 where the upper conveyor assembly functions to move the cartons 10 laterally into the adjacent storage bin by means of a lateral transfer mechanism associated with the upper conveyor 100.

Where cartons are to be retrieved from the bins, the same operation is repeated in a reverse manner, as will be readily apparent. Both the elevating upper conveyor assembly 100 and direction reversing conveyor assembly 80 have means in the form of a lift mechanism 150 to raise and lower them so as to place the upper surface of the upper conveyor assembly 100 at a level corresponding to any one of the horizontal rows of storage bins 18.

It will be noted that the lowest row of storage bins is located somewhat higher than the lower conveyor assembly 20 and that when the upper conveyor assembly is at its lowermost position, the inclined conveyor is actually in an essentially level, horizontal position communicating with the lower end of the direction reversing conveyor assembly 80. Likewise, when the upper conveyor assembly 100 is raised to its uppermost position, it is adjacent the top horizontal row of the storage bins in the particular rack.

Figure 3:
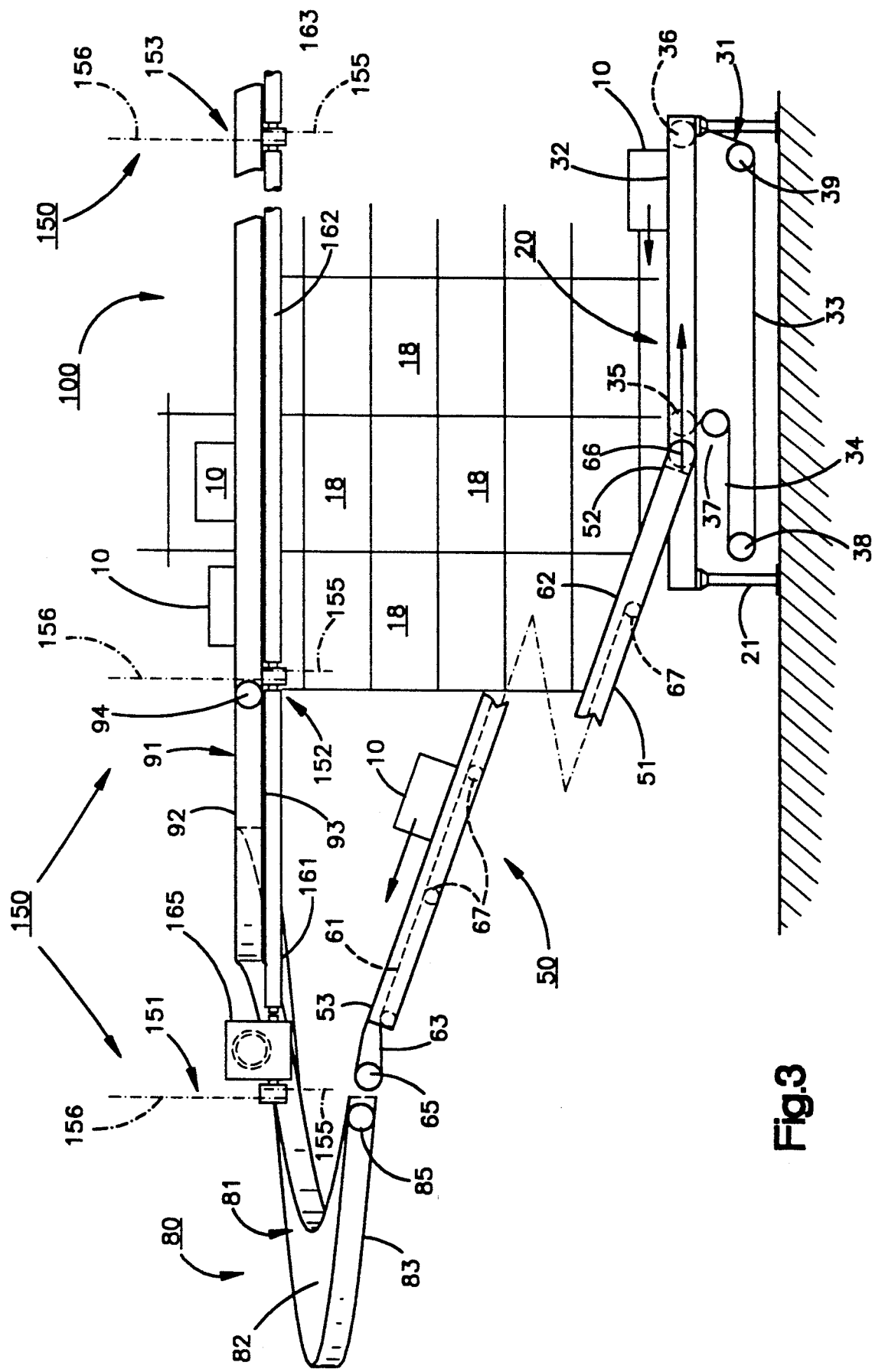
FIG. 3 is an elevational view of the various conveyor assemblies used in connection with the sorting and retrieval system of FIGS. 1 and 2.

When the system is in this condition, the inclined conveyor assembly is tilted at an angle of approximately 25°. In this position, as indicated in FIG. 3, the lower end of the inclined conveyor assembly 50 moves linearly to the right in a horizontal plane since the pivot point of the upper end moves only in a vertical path.

To accommodate this, the lower conveyor assembly 20 has means to be described below which enables it to extend and retract linearly so as to keep it at all times in proper cooperating relationship with the inclined conveyor assembly 50.

LOWER CONVEYOR ASSEMBLY

The lower conveyor assembly 20 has a stationary frame 21 and a linearly movable carriage 22 supported in the frame. The carriage is adapted to move through a limited path of travel on rails 23, best shown in FIGS. 6 and 7. The rails have both upper and lower horizontal ways 24 and 25, the upper ways 24 providing a surface for load-bearing rollers 26 located on opposite sides of the carriage 22. Horizontal guide rollers 27 engage the inwardly facing vertical surface of the rails 23 so as to accurately locate the lateral position of the carriage 22. The lower ways 25 of the rails provide surfaces for lower rollers 28 which prevent "kick up" of the carriage.

Figure 6:
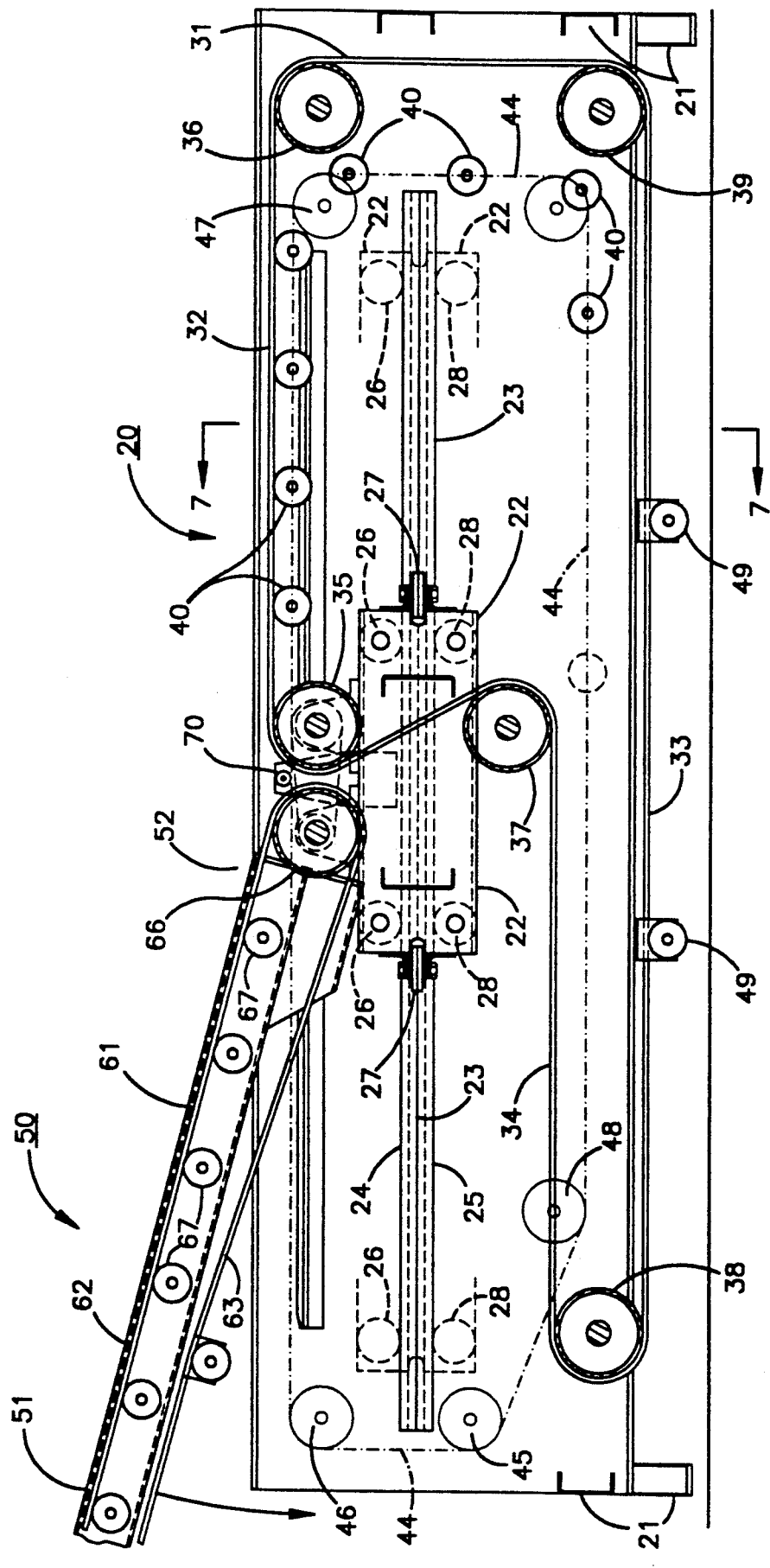
FIG. 6 is a fragmentary sectional view on an enlarged scale taken on the line 6—6 of FIG. 4, illustrating the linearly extensible lower conveyor assembly and a portion of the inclined conveyor assembly.

As indicated in FIG. 6, the carriage is adapted to move linearly along a path defined by the rails 23 to accommodate the necessary horizontal adjusting movement of the lower pivot axis of the inclined conveyor assembly 50 depending upon its angle of tilt.

The conveyor assembly 20 has an endless conveyor belt 31 with an upper or carrier span 32 and a lower or return span 33. Also, the belt 31 passes through an extension span 34, the length of which increases or decreases as the length of the upper span or carrier span 32 decreases or increases.

The belt 31 passes around a head pulley 35 journaled on the carriage 22 and a tail pulley 36 journaled at fixed position on the frame 21. As the belt passes around the head pulley 35 it proceeds downward and somewhat rearwardly to an idler pulley 37 also located on the carriage 22.

From the idler pulley 37, the belt passes through its extension span 34 to another idler pulley 38 located in fixed position on the frame 21. Then the lower return span 33 proceeds to another idler pulley 39 located in fixed position just below the tail pulley 36. The pully 38 is resiliently mounted to maintain tension on the belt 31.

A number of support rollers 40 are located below the carrier span of the belt with their ends mounted on horizontal tracks.

It will be apparent that the number of support rollers 40 will increase or decrease depending upon the length of the upper span 32 which in turn depends upon the position of the carriage 22. In order to assure that sufficient support is provided, a plurality of the support rollers 40 are connected to and located in spaced relation along a pair of roller chains 43 and 44 which are pulled along the guide tracks 41 and 42 in response to movement of the carriage 22.

Figure 7:
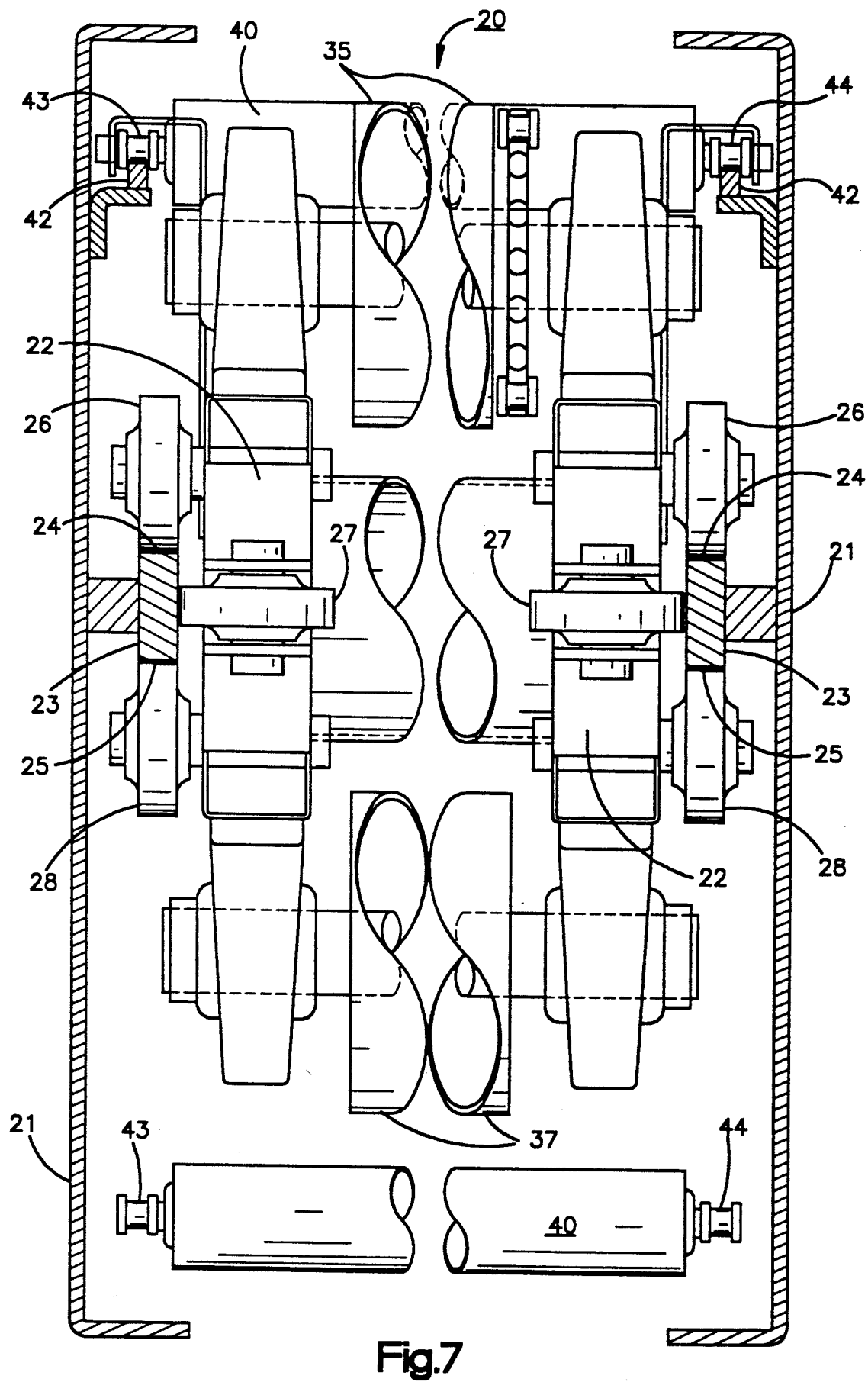
FIG. 7 is sectional view on an enlarged scale illustrating the movable carriage of the lower conveyor assembly and taken on the line 7—7 of FIG. 6.

The chains 43 and 44 pass around a plurality of sprockets 45, 46, 47 and 48 journaled on the frame. The chain is connected to the carriage as illustrated in FIG. 7 so that adequate rollers will be positioned below the carrier span regardless of the position of the carriage.

Also, two guide rollers 49 are provided below the return span of the belt 33.

THE INCLINED CONVEYOR ASSEMBLY

The inclined conveyor assembly 50 has a frame 51, its lower end 52 pivotally connected to the carriage 22 as illustrated in FIG. 6 and thus adapted for movement with the carriage in a horizontal path of travel as necessary. It will also be noted that the position of the carriage 22 depends upon the horizontal position of the lower end 52 of the inclined conveyor assembly 50. The upper end 53 of the inclined conveyor assembly 50 is pivotally connected to the direction reversing conveyor assembly 80 as will be described below.

The assembly 50 includes an endless conveyor belt 61 having an upper carrier span 62 and a lower return span 63. The belt passes around a head pulley 65 located at the upper end thereof and a tail pulley 66 located at the lower end thereof. It will be noted that the axis of the respective head pulley 65 and tail pulley 66 correspond with pivot axis about which the conveyor assembly 50 tilts. A plurality of support rollers 67 are journaled in the frame 51 and are located immediately below the carrier span 62 of the belt 61.

Located between the head end of the carrier span 32 of the belt 31 and the tail end of the carrier span 62 of the belt 61 is an intermediate transition roller 70. It will be noted that cartons 10 conveyed across the lower conveyor assembly 20 are passed onto the inclined conveyor assembly 50 where they are raised to the level of the direction reversing conveyor assembly.

DIRECTION REVERSING CONVEYOR ASSEMBLY

The direction reversing conveyor assembly 80 has two curved conveyor belts 81 and 91 which transport cartons 10 received from the inclined conveyor assembly 50 in a manner that is effective to reverse the direction of travel of the carton and deliver it to the adjacent end of the upper conveyor assembly 100. This direction reversal is accomplished by means of the curved 270° endless belt 81 and the curved 90° endless belt 91.

The belt 81 has a curved upper span 82 and a curved lower span 83, the spans extending between a head pulley 84 and a tail pulley 85. The upper span 82 has a number of support rolls 86 located in an arc to provide additional support. It will also be noted that the belt 81 conveys the cartons in a helical path up to the level at which the belt 81 meets the belt 91.

The curved 90° belt 91 has an upper span 92 and a return span 93 that extend between a head pulley 94 and a tail pulley 95. It will be noted that the 90° endless belt is in a level, horizontal plane rather than in a helical form as is the 270° belt 81. A number of support rolls 96 are provided below the upper carrier span 92.

The entire direction reversing assembly 80 is adapted for vertical movement between a position where the belt 91 is located at the same level as the lowest storage bin and a raised position wherein the belt 91 is at the level of the highest storage bin. The elevating system used cooperates with the same elevating system 150 used to raise and lower the upper conveyor assembly 100 as will be described in detail below.

THE TRANSFER CONVEYOR ASSEMBLY

The transfer conveyor assembly 100 unlike the other conveyor assemblies 20, 50 and 80, utilizes a bed of roller chains to move a carton linearly along its surface. It receives cartons 10 being conveyed by the belt 91 and then moves the cartons along the respective row of storage bins 18 to a desired position adjacent a predesignated bin.

The cartons 10 are transported along their linear path of travel by means of a roller chain system or longitudinal drive 110. When a carton 10 reaches a position adjacent the predetermined bin 18, the carton is moved laterally onto the bed of rolls in the bin by means of a lateral drive mechanism 130 that comprises a bed of rollers that have their axis aligned with the longitudinal direction of travel.

The longitudinal drive system 110 is adapted to be raised and lowered between an upper operating position and a lower inoperative position where a carton rests on the rollers of the lateral drive system and the roller chain drive of the longitudinal drive system 130 is dropped below the plane of the rolls.

The construction of the upper conveyor assembly 100 is best illustrated in FIGS. 8a, 8b, 8c and 9. The assembly comprises a pair of parallel longitudinal frame members 101 and 102 connected by lateral cross braces 103. Each of the cross braces has a pivot bracket 105 secured thereto for a purpose to be described below.

Secured below the cross braces 103 are three longitudinal U-shaped chain return channels 106, 107 and 108 (FIG. 9) which are used to guide the return span of the three roller chains to be described below.

A transition roller 109 is journaled at its ends to the frame members 101 and 102 to facilitate the travel of cartons from the curved conveyor belt 91 to the upper conveyor assembly 100.

The longitudinal drive mechanism 110 includes three U-shaped channel members 112 and 113 which are connected to one another by cross tubes 114 and 115. Each of the channel members 111, 112 and 113 has an elongated U-shaped rail channel 116, 117 and 118 welded therein to provide rails for the three roller chains. The assembly or bed formed by the channel beams 111, 112 and 113 and cross tubes 114 and 115 is connected to the upper ends of pivot links 120 which in turn are pivotally connected at their lower end to the pivot brackets 105 secured to the cross braces 103. With this arrangement, the entire support bed may be lifted and lowered in a path guided by the links 120 between a raised position shown in dashed lines in FIGS. 8a, 8b and 8c and a lowered position shown in solid lines in FIGS. 8a, 8b and 8c as well as in FIG. 9. The vertical movement is controlled by means of a fluid cylinder shown in FIG. 8c.

Each of the rails 116, 117 and 118 receives and guides one of three roller chains 121, 122 and 123. Each roller chain has an upper span 124 which is guided along the respective rail 116, 117 and 118, and a return span 125 which is guided through its return movement by the return channels 106, 107 and 108.

Each roller chain 121, 122 and 123 extends between a drive sprocket 126 and an idler sprocket 127. Another idler sprocket 128 functions as a guide to guide the chain from the drive sprocket 126 to the respective return channel 106, 107 and 108. The three drive sprockets 126 are secured to a common shaft which is driven by a chain drive mechanism through a gear motor roughly indicated in FIG. 8c.

The lateral drive mechanism 130 as indicated below includes a plurality of longitudinal rollers arranged with their axis extending parallel to the longitudinal direction of travel. The mechanism includes a plurality of U-shaped brackets 131, 132, 133 and 131 mounted in groups of four on each of the cross braces 103. Each of the brackets 131, 132, 133 and 134 has a journal 135, 136, 137 and 138 welded thereto, which serves as a bearing for the array of rollers. The rollers include four parallel rollers 141, 142, 143 and 144 with their axes running in a longitudinal direction. Each roller has a roller section that extends between a pair of the journals and the sections are interconnected by a shaft length which is received in the respective journal.

Figure 8A:
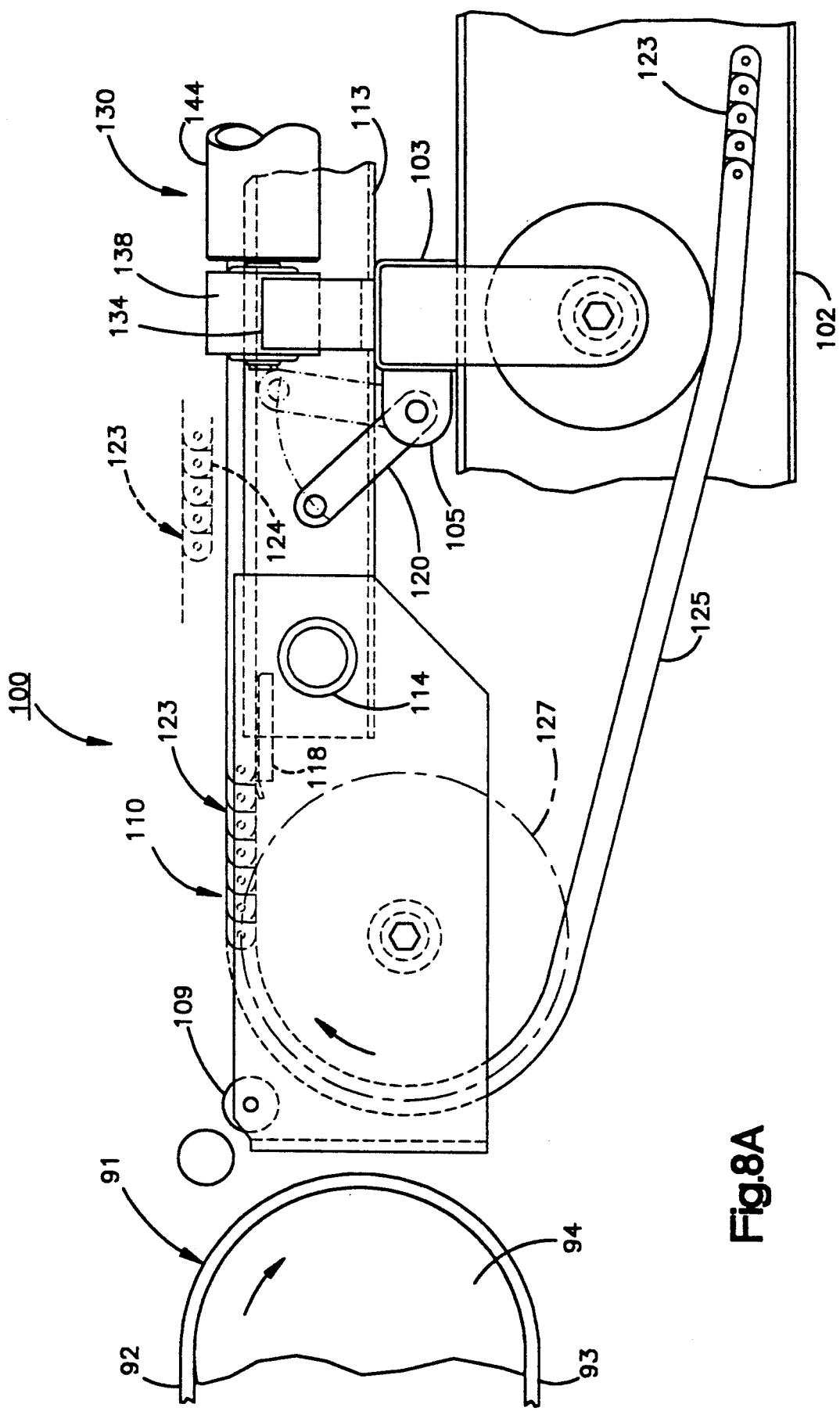
FIGS. 8a, 8b and 8c are fragmentary sectional views on an enlarged scale showing portions of the upper conveyor assembly and taken on the line 8—8 of FIG. 4.
Figure 8B:
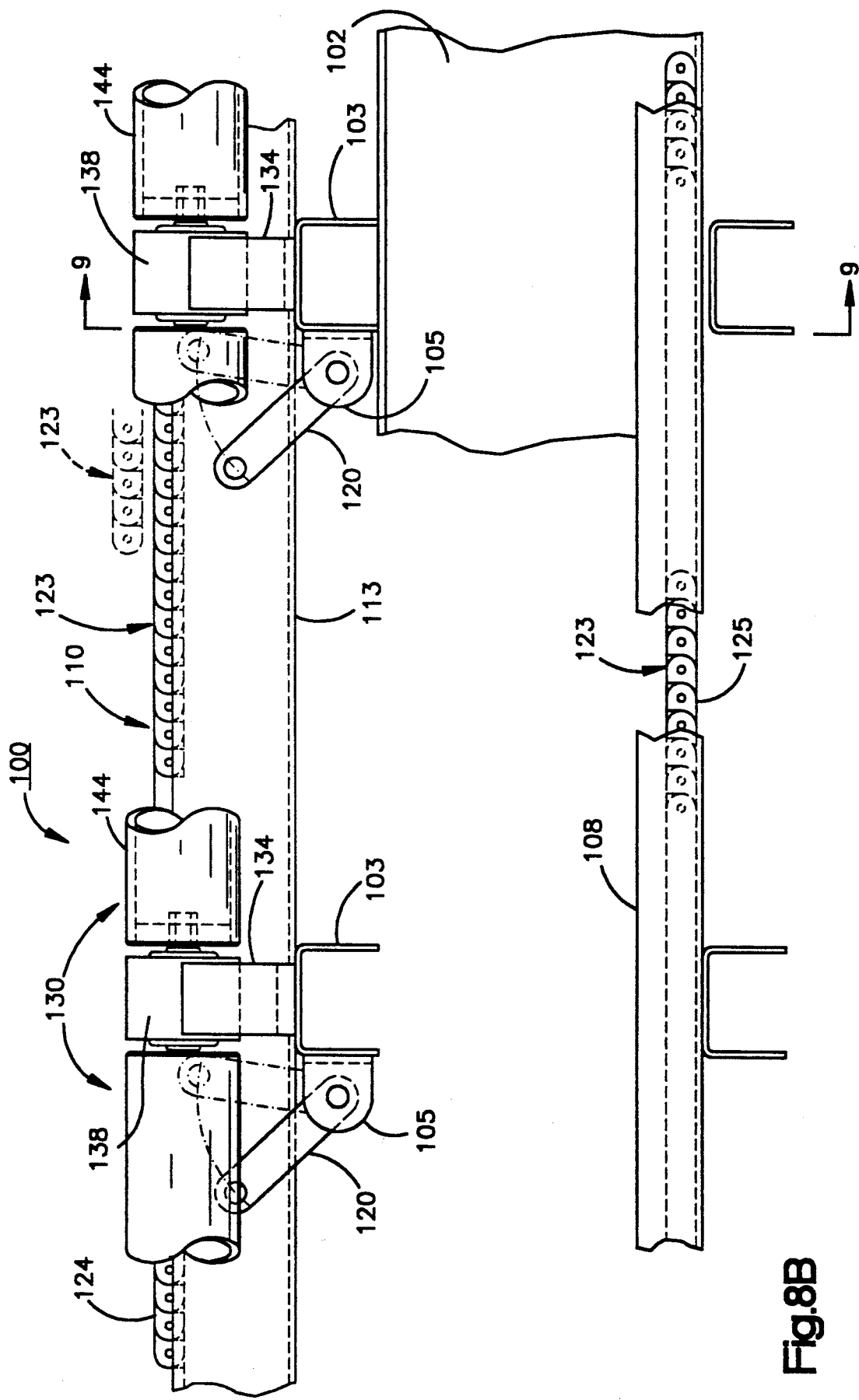
Figure 8C:
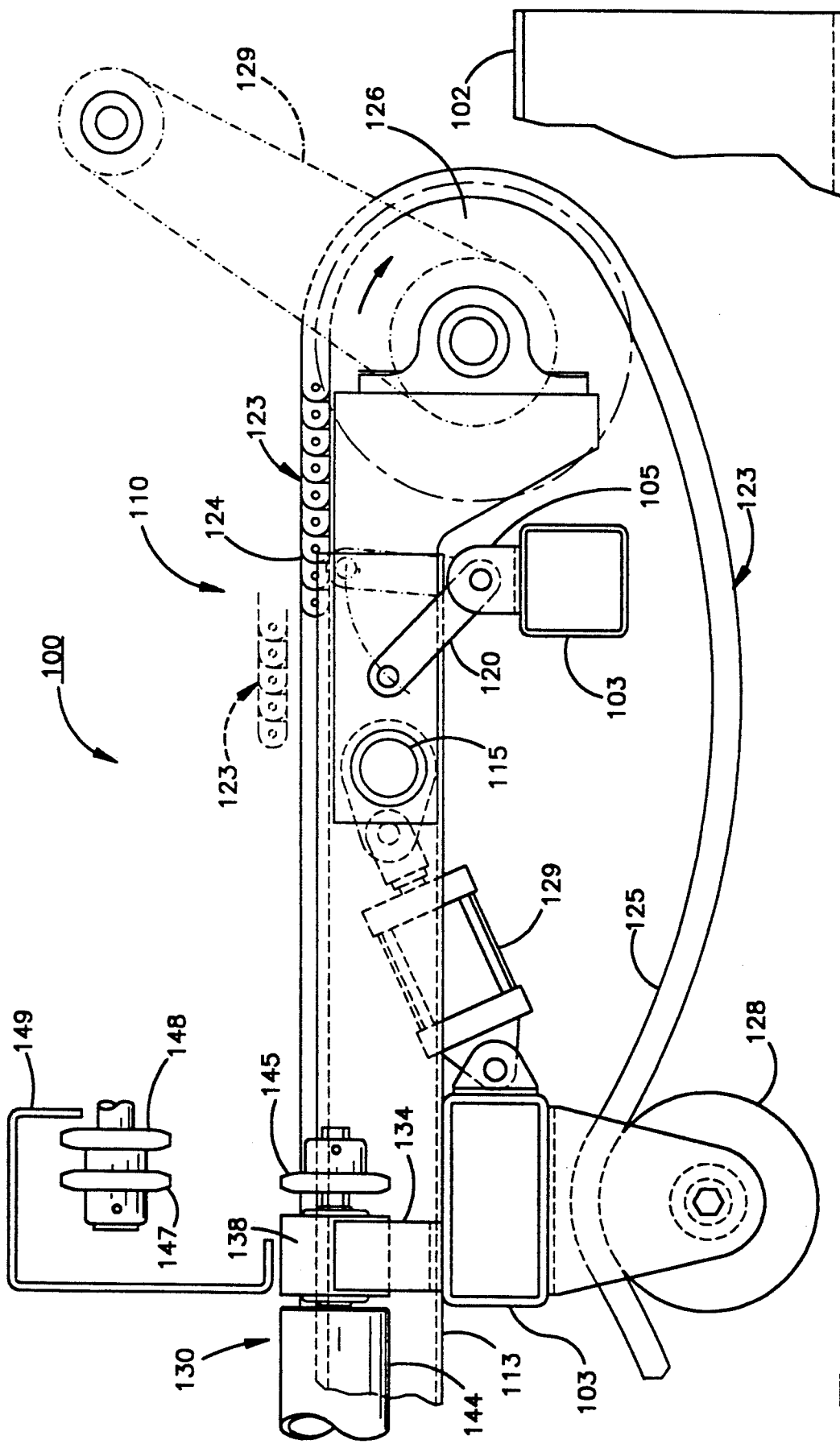

Referring to FIG. 8c, the shafts located at the far ends of each roll have portions that extend beyond the respective bearing 135, 136, 137 and 138 and which receive a drive sprocket thereon. Each of the four drive sprockets 145 is operated by a drive chain which in turn extends to a transfer sprocket 147 located on a transfer shaft. The transfer shaft is in turn driven through a parallel sprocket 148 by a chain connected to a main drive system. The sprockets 147 and 148 are mounted in a bracket 149 secured to the frame members 101 and 102.

LIFT MECHANISM

Figure 4:
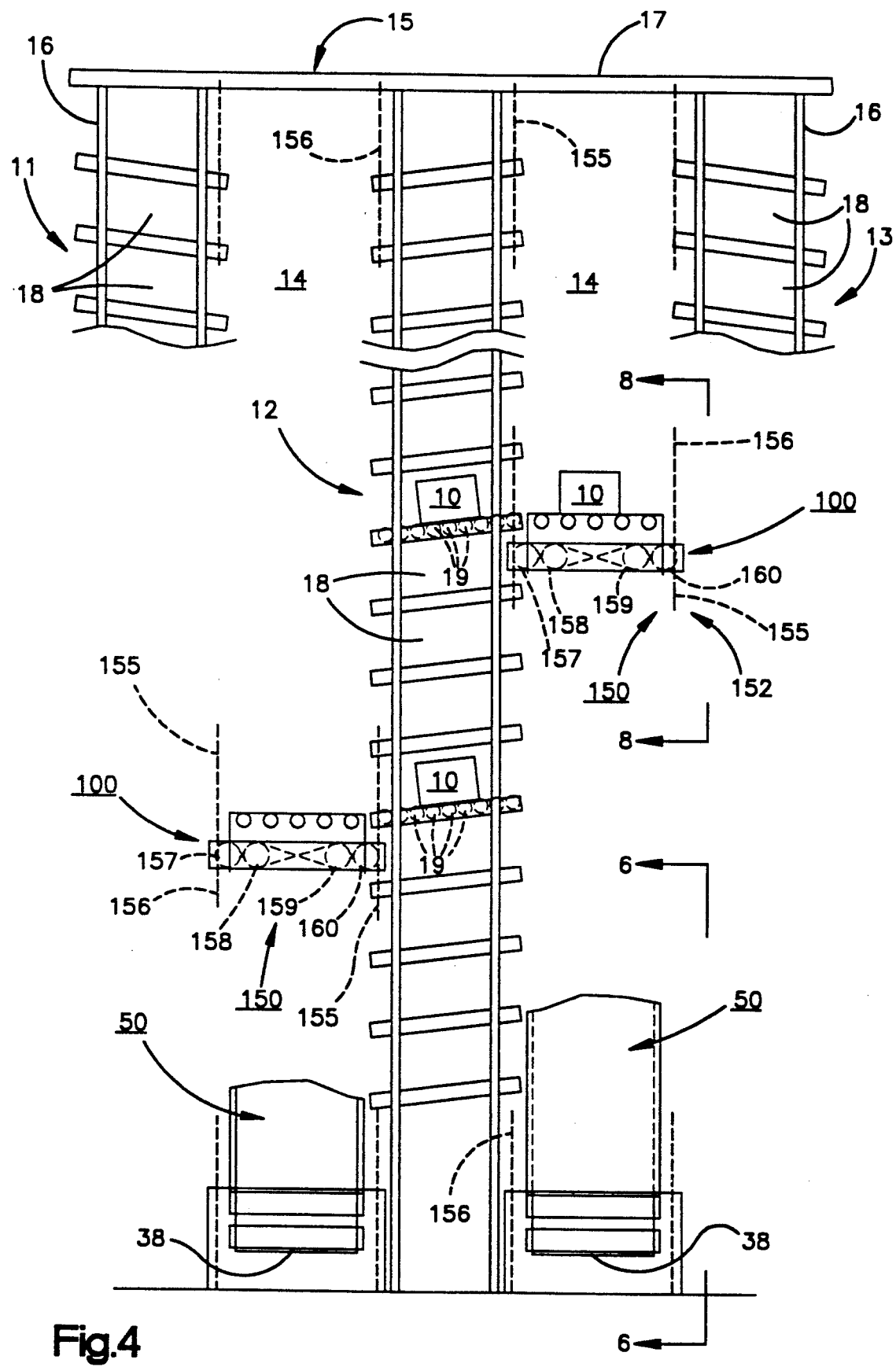
FIG. 4 is an end elevation of the sorting and retrieval system of FIGS. 1, 2 and 3 with parts broken away for the purpose of illustration.
Figure 5:
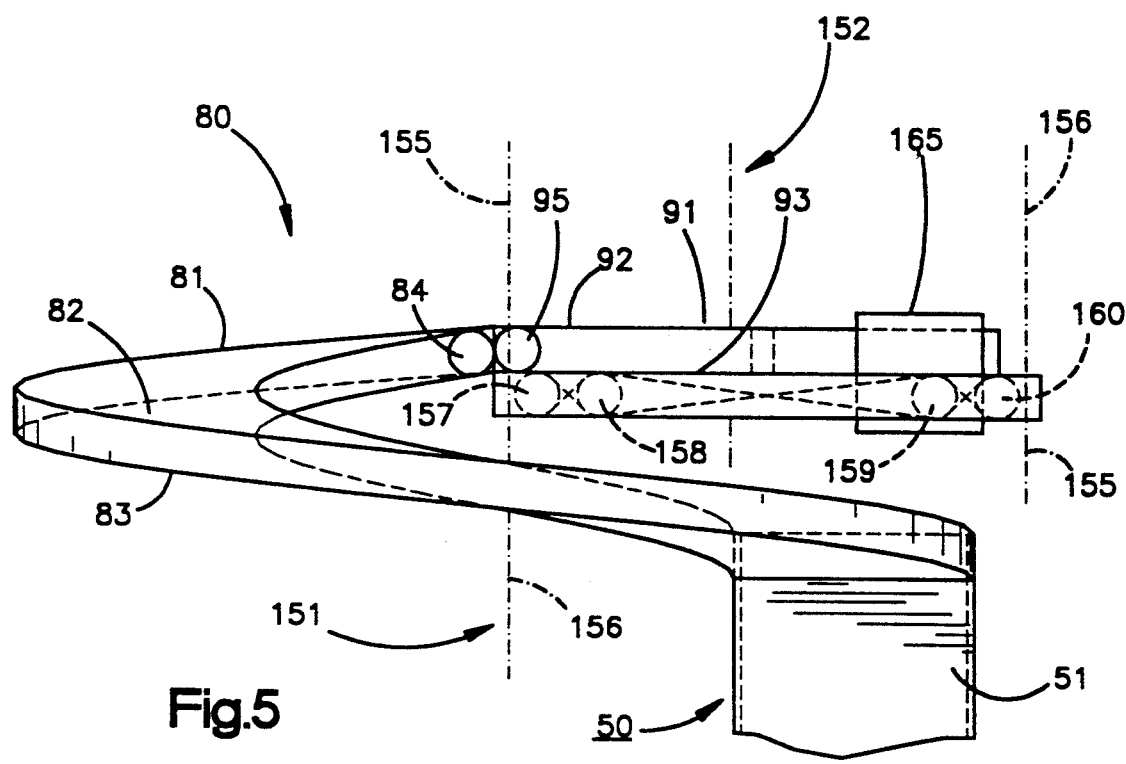
FIG. 5 is a fragmentary elevational view on an enlarged scale illustrating the direction reversing conveyor assembly.
Figure 9:
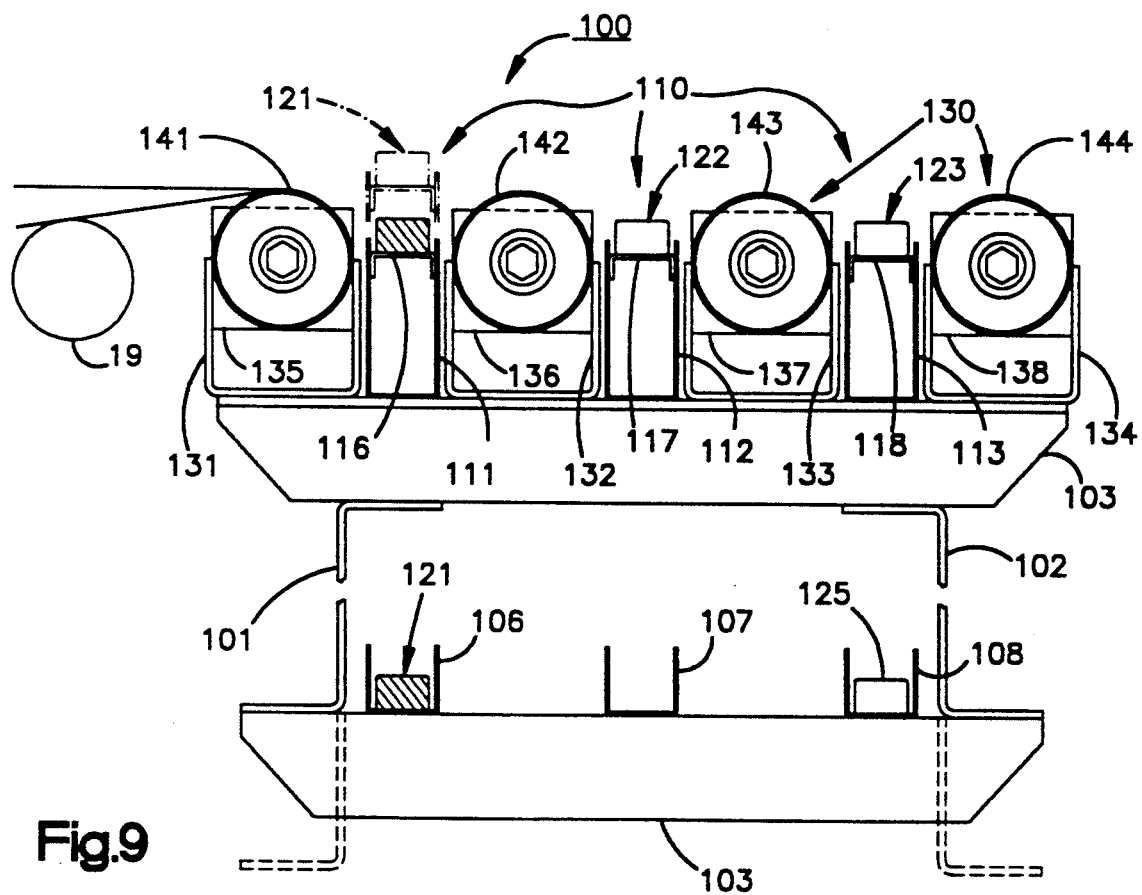
FIG. 9 is a fragmentary sectional view on an enlarged scale illustrating the lateral transfer means of the upper conveyor assembly and taken on the line 9—9 of FIG. 8b.

The reversing conveyor system 80 and the upper conveyor or transfer conveyor 100 are raised and lowered between their various vertical positions by means of a lift mechanism 150. The lift mechanism includes three chain and sprocket assemblies 151, 152 and 153 best illustrated in FIGS. 3, 4 and 5. Each of the assemblies 152 and 153 includes a pair of vertically extending roller chains 155 and 156 that are connected at their upper ends to overhead structure and at their lower ends to floor structure. The chain and sprocket assembly 151 has its respective chains 155 and 156 spaced further apart in view of the additional lateral width of the reversing conveyor assembly 80. This is best shown in FIGS. 2 and 5.

The connection between the vertical chains 155 and 156 and the respective connection points on the conveyor assemblies 80 and 100 is unique and will be described with respect to the chain and sprocket assembly 152 best illustrated in FIG. 4. It will be noted that each of the assemblies has a comparable connection arrangement, however.

At the connection point to the upper conveyor 100, the conveyor is provided with four pairs of laterally spaced sprockets 157, 158, 159 and 160. Referring first to the portion of the roller chain 155 connected to overhead structure, the chain passes downwardly and around a sprocket of the pair 157, up and over the adjacent sprocket of the pair 158, down and under a sprocket of the pair 159 and then up and over a sprocket of the pair 160. From there, the roller chain 155 extends downwardly to floor structure. It will be noted that two coaxial sprockets 157 are provided at the connection point so that the pair of sprockets 157 are axially spaced somewhat from one another.

The roller chain 156 of the chain and sprocket assembly 152 extends downwardly from its overhead connection point to the parallel sprocket of the pair 160 where it passes under the sprocket and then up and over the sprocket of the next pair 159. The chain 156 then extends downwardly under the respective sprocket of the pair 158 and then up and over the respective sprocket of the pair 157. From there, the chain 156 extends downwardly to floor structure. With this unique arrangement, the sprockets can be driven through their shafts to raise and lower the conveyor assemblies 80 and 100 in a simple and convenient manner.

The drive for the lift mechanism 150 is located in association with the chain and sprocket assembly 151. This is best illustrated in FIGS. 2, 3 and 5. The drive is accomplished by means of torque tubes which extend longitudinally from the chain and sprocket assembly 151 to the sprocket pair 160 of the assembly 152. Another torque tube 162 extends from the sprocket pair 160 to the sprocket pair 160 of the chain and sprocket assembly 153. The torque tube 161 is connected at one end to a gear motor unit 165 that travels up and down with the conveyor assemblies 80 and 100. With the torque tube arrangement, all of the sprocket pairs 160 are driven simultaneously to raise and lower the conveyor assemblies.

OPERATION

In the foregoing description, the conveyor assemblies 20, 50, 80 and 100 have been described in connection with an incoming carton which is to be stored in one of the bins 18. It will be noted, however, that the particular arrangement shown is also used to retrieve a carton from a bin 18 and deliver it to an outgoing dock.

For the purpose of describing the overall operation, the transporting of a carton 10 into storage will be used, however, it will be understood that the reverse procedure is followed in unloading a carton from a particular bin.

Initially, a carton 10 is delivered to the tail end of the lower conveyor assembly 20 where it is transported by the upper span 32 of the belt 31 to a position over the tail pulley 36. In the meantime, the inclined conveyor assembly 50 has been tilted by vertical movement of the reversing conveyor assembly 80 and upper conveyor assembly 100 caused by the lift mechanism 150 in order to position the surface of the upper conveyor assembly at a desired horizontal row of bins. The particular position will determine the position of the carriage 22 which in turn properly adjusts the length of the upper span 32 and the horizontal position of the tail pulley 66 of the inclined conveyor assembly 50.

From the lower conveyor assembly 20, the carton is passed to the belt 61 of the inclined conveyor assembly 50. From that point, the carton is carried upward by the carrier span 62 to the upper end of the inclined conveyor assembly 50 where the carton is passed on to the reversing conveyor assembly 80. The carton is received by the upper span 82 of the curved belt 81 and conveyed through a 270° arc to the upper span 92 of the curved belt 91.

The travel of the carton around the curved upper span 82 also carries the carton upwardly in a helical path. The upper span 92 of the belt 90 is in a horizontal plane and carries the carton through a 90° arc to the upper conveyor assembly 100.

As the carton is delivered to the upper conveyor assembly 100, the longitudinal drive mechanism 110 has been raised to the upward position by the fluid cylinder 119 so that the plane defined by the roller chains 121, 122 and 123 is above the plane defined by the rollers 141, 142, 143 and 144. The roller chains carry the carton longitudinally along the aisle adjacent the respective row of storage bins until a position adjacent the predetermined storage bin has been reached.

At this point, the fluid cylinder 119 is actuated to pivot the links 120 and lower the upper spans 124 of the roller chains 121, 122 and 123 downwardly until the plane they define is below the plane of the rollers 141, 142, 143 and 144. These longitudinal rollers are driven continuously so that they convey the carton laterally into the bin until the carton rests on the rolls that define the sloping surface of the bin.

It should be noted that other variations on the mechanism may be used, for example, another set of assemblies 20, 50, 80 and 100 may be stacked on top of the arrangement described to add additional vertical storage capacity to the overall system. Also, it may be possible to use the arrangement of conveyor assemblies shown both for delivery and retrieval of cartons to and from the bins so that pairs of stacks of storage bins may be located side-by-side with their openings facing in opposite directions. In that way, the arrangement could be used to deliver and retrieve cartons to and from each side of the upper conveyor assembly. Various other modifications may also be used as will be readily apparent.

It will be apparent to those skilled in the art that other variations and modifications of the specific apparatus herein shown and described may be used all within intended spirit and scope of the invention. Accordingly, the invention is not to be limited in scope and effect to the specific apparatus herein shown and described nor in any other way that is inconsistent with the extent to which the progress in the art has been advanced by the invention.

What is claimed is:

1. An article sorting and retrieval system for use in warehousing facilities wherein articles are stored in at least one vertical rack assembly with open-sided storage bins arranged in horizontal rows and vertical columns, comprising:
    a linearly extensibly lower conveyor assembly adapted to transport items parallel to the rows of said rack assembly;
    an inclined conveyor assembly having its lower end operatively associated with one end of said lower conveyor assembly and having a variable angle of inclination;
    a vertically movable upper conveyor assembly located above and parallel to said lower conveyor assembly and adapted to be raised and lowered between an upper position and a lower position whereby said upper conveyor assembly may be selectively positioned in operative association with the bins of each of said rows;
    a curved, reversing conveyor assembly adapted to be raised and lowered with said upper conveyor assembly and being operatively associated with at its lower end with the upper end of said inclined conveyor assembly and at its upper end with said upper conveyor assembly;
    means for raising and lowering said upper conveyor assembly and said reversing conveyor assembly; and
    lateral transfer means operatively associated with said upper conveyor assembly for selectively moving articles from said upper conveyor assembly to and from any one of the storage bins in the row adjacent the upper conveyor assembly.

2. A sorting and retrieval system as defined in claim 1 wherein said lower conveyor assembly comprises an endless belt, a head pulley, a tail pulley and a plurality of idler pulleys, said endless belt having a variable length upper span extending between said head pulley and said tail pulley, a return span extending between two idler pulleys and a variable length, adjuster span extending between a pair of said idler pulleys and that increases and decreases in length in inverse relation to increase and decrease in length of said upper span, and means for varying the lengths of said upper span and adjusting span in response to the angle of inclination of said inclined conveyor assembly.

3. A sorting and retrieval system as defined in claim 2 wherein said means for varying the lengths of said upper span and said adjusting span comprises a carriage operatively associated with both of said lower conveyor assembly and said inclined conveyor assembly and adapted for linear travel in a horizontal path of travel parallel to said upper span, said head pulley and one of said pair of idler pulleys being mounted on said carriage and the lower end of said inclined conveyor assembly being operatively connected to said carriage.

4. A sorting and retrieval system as defined in claim 3 wherein the other pulley of said pair of idler pulleys is resiliently mounted for maintaining tension on said endless belt.

5. A sorting and retrieval system as defined in claim 1 wherein said inclined conveyor assembly comprises an endless belt, a head pulley and a tail pulley, said belt having an upper operating span of fixed length and a lower return span, one of said pulleys being adapted for vertical movement with said reversing conveyor assembly to vary the angle of inclination of said upper span and the other of said pulleys being adapted for horizontal movement to accommodate the vertical movement of said one pulley.

6. A sorting and retrieval system as defined in claim 1 wherein said reversing conveyor assembly comprises a curved 270° endless belt, with a fixed axis of curvature and with an upper operating span defining a 270° arc in a space extending beyond the end of the respective rack assembly; and a curved 90° endless belt having a fixed axis of curvature and having a horizontal upper operating span defining a 90° arc that is external to and tangent to said 270° arc, both of said arcs being tangent to said inclined conveyor.

7. A sorting and retrieval system as defined in claim 6 wherein said upper operating span of said 270° endless belt has a helical path of travel that has a vertical height extending from the upper end of said inclined conveyor assembly to said upper conveyor assembly.

8. A sorting and retrieval system as defined in claim 7 wherein said vertical height of said helical path is approximately the same as the vertical distance between said rows of storage bins.

9. A sorting and retrieval system as defined in claim 1 wherein said upper conveyor assembly comprises a plurality of endless, parallel roller chains and a plurality of respective head sprockets axially spaced along and fixed to a common sprocket shaft, and a plurality of respective tail sprockets axially spaced along and fixed to a common sprocket shaft, each of said endless roller chains having an upper span extending between its respective head and tail sprockets wherein said upper spans define a conveying surface whereby articles are conveyed linearly along said surface and means for moving said upper spans of said roller chains in a vertical path between a raised operating position and a lowered inoperative position.

10. A sorting and retrieval system as defined in claim 9 wherein said lateral transfer means comprises a plurality of parallel rollers with their axes located parallel to the direction of travel of said upper spans of said roller chains, said rollers including rollers located in the longitudinal spaces between the spaced, parallel upper spans of said roller chains, said rollers defining a generally horizontal conveying surface upon which articles are conveyed in a lateral direction relative to said roller chains, said surface being adapted to engage articles to be transported when said upper spans of said roller chains are moved to their lowered position, and
    drive means for turning said parallel rollers.

11. A sorting and retrieval system as defined in claim 1 wherein said means for raising and lowering said upper conveyor assembly and said reversing conveyor assembly comprises a plurality of vertically arranged pairs of roller chains, the chains of each pair extending between overhead structure and floor structure, and an assembly of pairs of sprockets for each pair of roller chains, mounted on one of said upper conveyor assembly and said reversing conveyor assembly, each pair having its respective sprockets axially spaced from one another and rigidly connected to one another, said pairs including two end pairs and two intermediate pairs, one chain of each chain pair extending down and under one end sprocket, up and over an adjacent intermediate sprocket, down and under the other intermediate sprocket, up and over the other end sprocket and down to the floor structure, the other chain of said pair following a corresponding sinuous path from the opposite side and engaging the other sprockets of the respective sprocket pairs, and drive means for turning at least one of said sprocket pairs whereby the respective conveyor assemblies are moved to a predetermined vertical position.

12. In a conveyor system, a linearly extensible horizontal conveyor assembly; and an inclined conveyor assembly having its lower end operatively associated with one end of said lower conveyor assembly and having a variable angle of inclination, said horizontal conveyor assembly having an endless belt, a head pulley, a tail pulley and a plurality of idler pulleys, said endless belt having a variable length upper span extending between said head pulley and said tail pulley, a return span extending between two idler pulleys and a variable-length, adjuster span extending between a pair of said idler pulleys that increases and decreases in length in inverse relation to increase and decrease in length of said upper span and means for varying the lengths of said upper span and adjusting span in response to the angle of inclination of said inclined conveyor assembly.

13. A conveyor system as defined in claim 12 wherein said means for varying the lengths of said upper span and said adjusting span comprises a carriage operatively associated with both of said lower conveyor assembly and said inclined conveyor assembly and adapted for linear travel in a horizontal path of travel parallel to the direction of travel of said upper span, said head pulley and one of said pair of idler pulleys being mounted on said carriage and the lower end of said inclined conveyor assembly being operatively connected to said carriage.

14. A conveyor system as defined in claim 13 wherein the other pulley of said pair of idler pulleys is resiliently mounted for maintaining tension on said endless belt.

15. A sorting and retrieval system as defined in claim 13 wherein said inclined conveyor comprises an endless belt, a head pulley and a tail pulley, said belt having an upper operating span of fixed length and a lower return span, one of said pulleys being adapted for vertical movement to vary the angle of inclination of said upper span and the other of said pulleys being adapted for horizontal movement with said carriage to accommodate the vertical movement of said one pulley.

16. An article sorting and retrieval system for use in warehousing facilities wherein articles are stored in at least one vertical rack assembly with open-sided storage bins arranged in a plurality of superposed horizontal rows and a plurality of vertical columns positioned side-by-side adjacent one another, comprising:

a vertically movable conveyor assembly extending longitudinally the length of said rows and adapted to be raised and lowered between an upper position and a lower position whereby said conveyor assembly may be selectively positioned vertically in operative association with all of the bins of each of said rows;

means operatively associated with said conveyor assembly for conveying articles in a direction parallel to said rows from one end of said conveyor to another along a longitudinal path of travel adjacent the respective row so as to selectively position an article at any one of said bins of the adjacent row, lateral transfer means operatively associated with said conveyor assembly for selectively moving articles from said conveyor assembly to and from any one of the storage bins in the adjacent row;

a plurality of vertically arranged pairs of roller chains, the chains of each pair extending between overhead structure and floor structure; and an assembly of pairs of sprockets for each pair of roller chains, mounted on said conveyor assembly, each pair having its respective sprockets axially spaced from one another and rigidly connected to one another, said pairs including two end pairs and two intermediate paris, one chain of each chain pair extending down and under one end sprocket, up and over an adjacent intermediate sprocket, down and under the other intermediate sprocket, up and over the other end sprocket and down to the floor structure, the other chain of said pair following a corresponding sinuous path from the opposite side and engaging the other sprockets of the respective sprocket pairs, and drive means for turning at least one of said sprocket pair whereby the conveyor assembly may be moved to a predetermined vertical position.

17. A sorting and retrieval system as defined in claim 16 wherein said upper conveyor assembly comprises a plurality of endless, parallel roller chains and a plurality of respective head sprockets axially spaced along and fixed to a common sprocket shaft, and a plurality of respective tail sprockets axially spaced along and fixed to a common sprocket shaft, each of said endless roller chains having an upper span extending between its respective head and tail sprockets wherein said upper spans define a conveying surface whereby articles are conveyed linearly on said surface and means for moving said upper spans of said roller chains in a vertical path between a raised operating position and a lowered inoperative position.

18. A sorting and retrieval system as defined in claim 17 wherein said lateral transfer means comprises a plurality of parallel rollers with their axes located parallel to the direction of travel of said upper spans of said roller chains, said rollers including rollers located in the longitudinal spaces between the spaced, parallel upper spans of said roller chains, said rollers defining a generally horizontal conveying surface upon which articles are conveyed in a lateral direction relative to said roller chains, said surface being adapted to engage articles to be transported when said upper spans of said roller chains are moved to their lowered position, and drive means for turning said parallel rollers.

19. An elevating device for raising and lowering platforms comprising a plurality of vertically arranged pairs of roller chains, the chains of each pair extending between overhead structure and floor structure and an assembly of pairs of sprockets for each pair of roller chains, mounted on said platform, each pair having its respective sprockets axially spaced from one another and rigidly connected to one another, said pairs including two end pairs and two intermediate pairs, one chain of each chain pair extending down and under one end sprocket, up and over an adjacent intermediate sprocket, down and under the other intermediate sprocket, up and over the other end sprocket and down to the floor structure, the other chain of said pair following a corresponding sinuous path from the opposite side and engaging the other sprockets of the respective sprocket pairs, and means for turning at least one of said sprocket pairs whereby the platform may be moved to a predetermined vertical position.

20. An article sorting and retrieval system for use in warehousing facilities wherein articles are stored in at least one vertical rack assembly with open-sided storage bins arranged in horizontal rows and vertical columns, comprising:
- a lower conveyor assembly adapted to transport items parallel to the rows of said rack assembly;
- a vertically movable upper conveyor assembly located above and parallel to said lower conveyor assembly and adapted to convey articles in a direction opposite to that of said lower conveyor assembly and to be raised and lowered between an upper position and a lower position whereby said upper conveyor assembly may be selectively positioned in operative association with the bins of each of said rows; and
- means for conveying articles vertically between one end of said lower conveyor assembly and one end of said upper conveyor assembly and for reversing the direction of travel of said articles during said vertical movement;
- means for raising and lowering said upper conveyor assembly ; and
- lateral transfer means operatively associated with said upper conveyor assembly for selectively moving articles from said upper conveyor assembly to and from any one of the storage bins in the row adjacent the upper conveyor assembly.

21. An article sorting and retrieval system as defined in claim 20 wherein said means for conveying articles vertically comprises:
- an inclined conveyor assembly having its lower end operatively associated with one end of said lower conveyor assembly and having a variable angle of inclination; and
- a curved, reversing conveyor assembly adapted to be raised and lowered with said upper conveyor assembly and being operatively associated at its lower end with the upper end of said inclined conveyor assembly and at its upper end with said upper conveyor assembly.

22. A sorting and retrieval system as defined in claim 20 wherein said upper conveyor assembly comprises a plurality of endless, parallel roller chains and a plurality of respective head sprockets axially spaced along and fixed to a common sprocket shaft, and a plurality of respective tail sprockets axially spaced along and fixed to a common sprocket shaft, each of said endless roller chains having an upper span extending between its respective head and tail sprockets wherein said upper spans define a conveying surface whereby articles are conveyed linearly along said surface and means for moving said upper spans of said roller chains in a vertical path between a raised operating position and a lowered inoperative position.

23. A sorting and retrieval system as defined in claim 22 wherein said lateral transfer means comprises a plurality of parallel rollers with their axes located parallel to the direction of travel of said upper spans of said roller chains, said rollers including rollers located in the longitudinal spaces between the spaced, parallel upper spans of said roller chains, said rollers defining a generally horizontal conveying surface upon which articles are conveyed in a lateral direction relative to said roller chains, said surface being adapted to engage articles to be transported when said upper spans of said roller chains are moved to their lowered position, and drive means for turning said parallel rollers.

24. A sorting and retrieval system as defined in claim 20 wherein said means for raising and lowering said upper conveyor assembly and said reversing conveyor assembly comprises a plurality of vertically arranged pairs of roller chains, the chains of each pair extending between overhead structure and floor structure, and an assembly of pairs of sprockets for each pair of roller chains, mounted on one of said upper conveyor assembly and said reversing conveyor assembly, each pair having its respective sprockets axially spaced from one another and rigidly connected to one another, said pairs including two end pairs and two intermediate pairs, one chain of each chain pair extending down and under one end sprocket, up and over an adjacent intermediate sprocket, down and under the other intermediate sprocket, up and over the other end sprocket and down to the floor structure, the other chain of said pair following a corresponding sinuous path from the opposite side and engaging the other sprockets of the respective sprocket pairs, and drive means for turning at least one of said sprocket pairs whereby the respective conveyor assemblies are moved to a predetermined vertical position.

* * * * *